United States Patent [19]

Roudil

[11] 3,759,467
[45] Sept. 18, 1973

[54] METHOD AND MEANS FOR OPPOSING THE ROTATION OF A WINDMILLING TURBOJET ROTOR DURING FLIGHT

[75] Inventor: Maurice Jean Clement Roudil, Saint-Maur-des-Fosses, France

[73] Assignee: Societe Nationale d'Etude et de Construction de Moteurs d'Aviation, Paris, France

[22] Filed: July 9, 1970

[21] Appl. No.: 53,599

[30] Foreign Application Priority Data
July 10, 1969 France .............................. 6923492

[52] U.S. Cl. ............... 244/53 R, 244/23 D, 60/229, 60/225, 60/204
[51] Int. Cl. .......................................... B64d 33/04
[58] Field of Search .............. 244/53 R, 12 D, 23 D; 60/229, 225, 39.09 R, 204, 223, 200; 239/265.19

[56] References Cited
UNITED STATES PATENTS 3,060,685   10/1962   Tonnies et al. ............... 60/39.09 R
3,220,669   11/1965   Lewis et al. ................... 244/53 R X
3,493,198   2/1970    Roed ............................. 244/53 R
3,658,279   4/1972    Robertson ..................... 244/53 R Primary Examiner—Milton Buchler
Assistant Examiner—E. R. Kazenske
Attorney—William J. Daniel

[57] ABSTRACT

A method and means for opposing the windmilling of the rotor of a turbojet engine on board an aircraft as produced by the incoming stream of air impinging on a disabled turbojet. The windmilling is stopped, in the case of a turbojet engine having a thrust reverser device and a jet-diverting passageway, by moving said thrust reverser device to its thrust reversing position, whereby the flow of air is diverted into said jet-diverting passageway, and throttling said jet-diverting passageway. The jet-diverting passageway may be throttled for this purpose by a mechanical or pneumatic resistance to free flow through such passageway.

27 Claims, 8 Drawing Figures

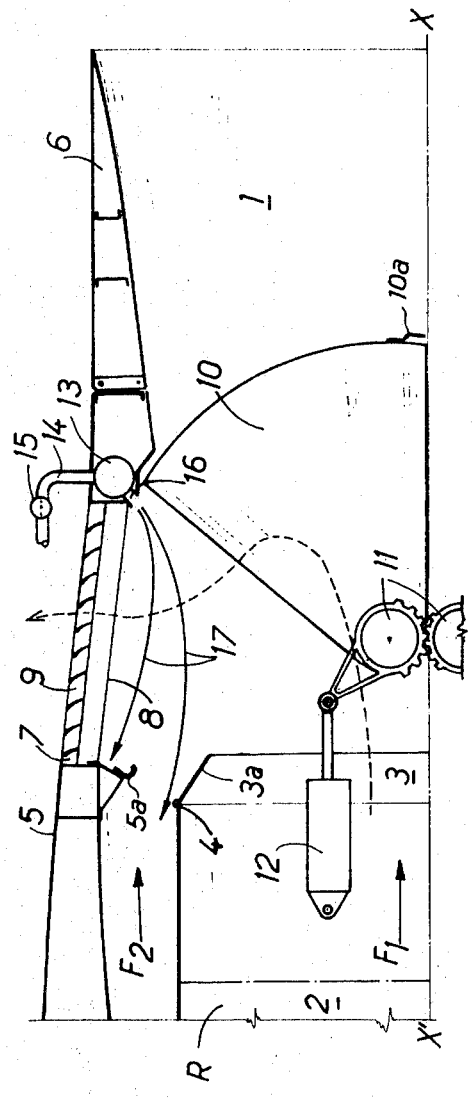
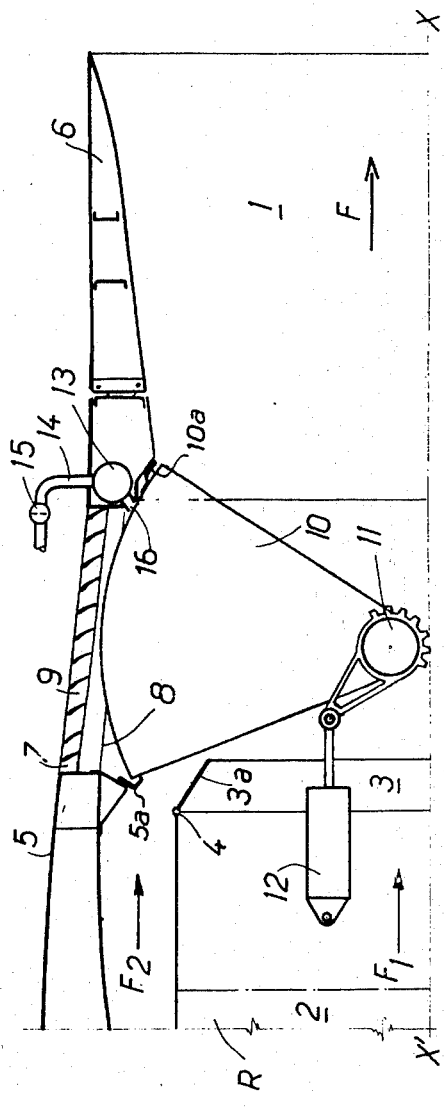
FIG.:1a  FIG.:1

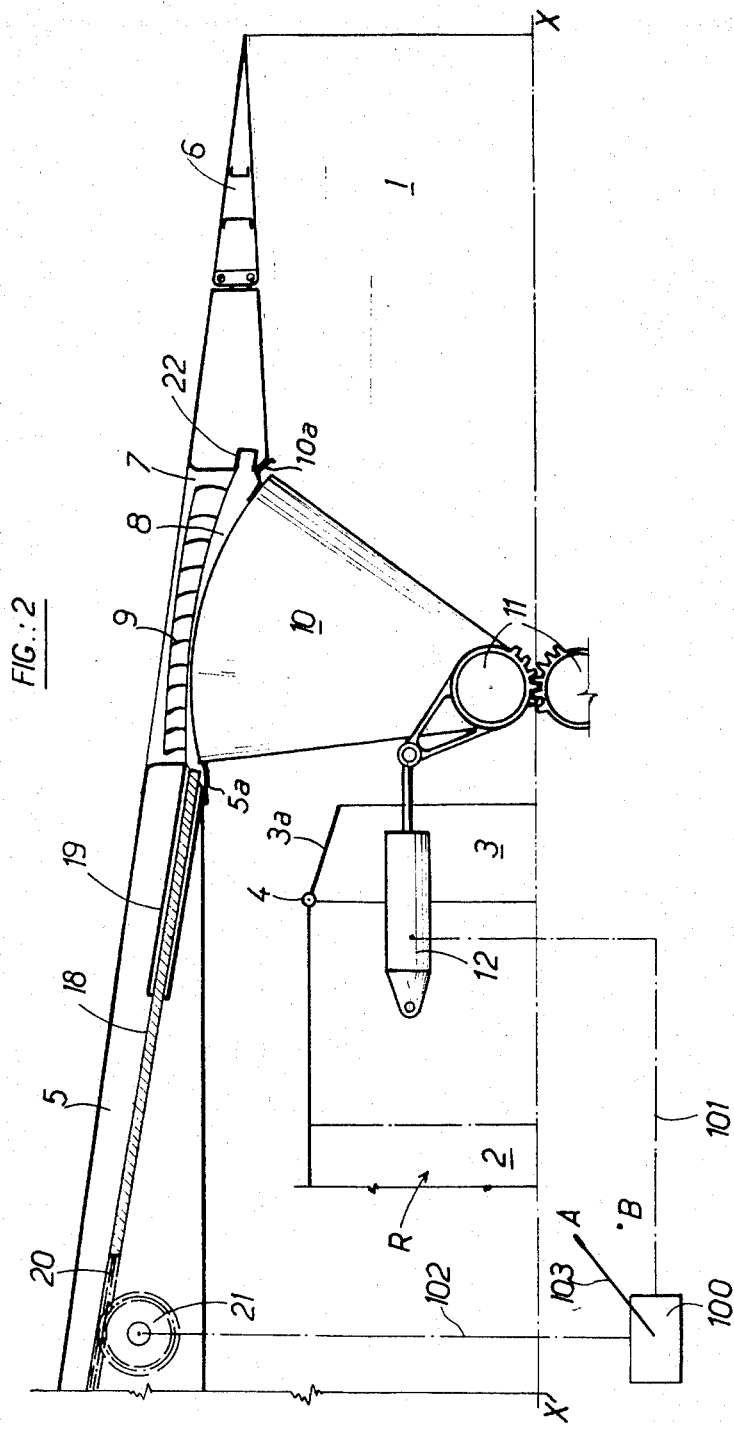

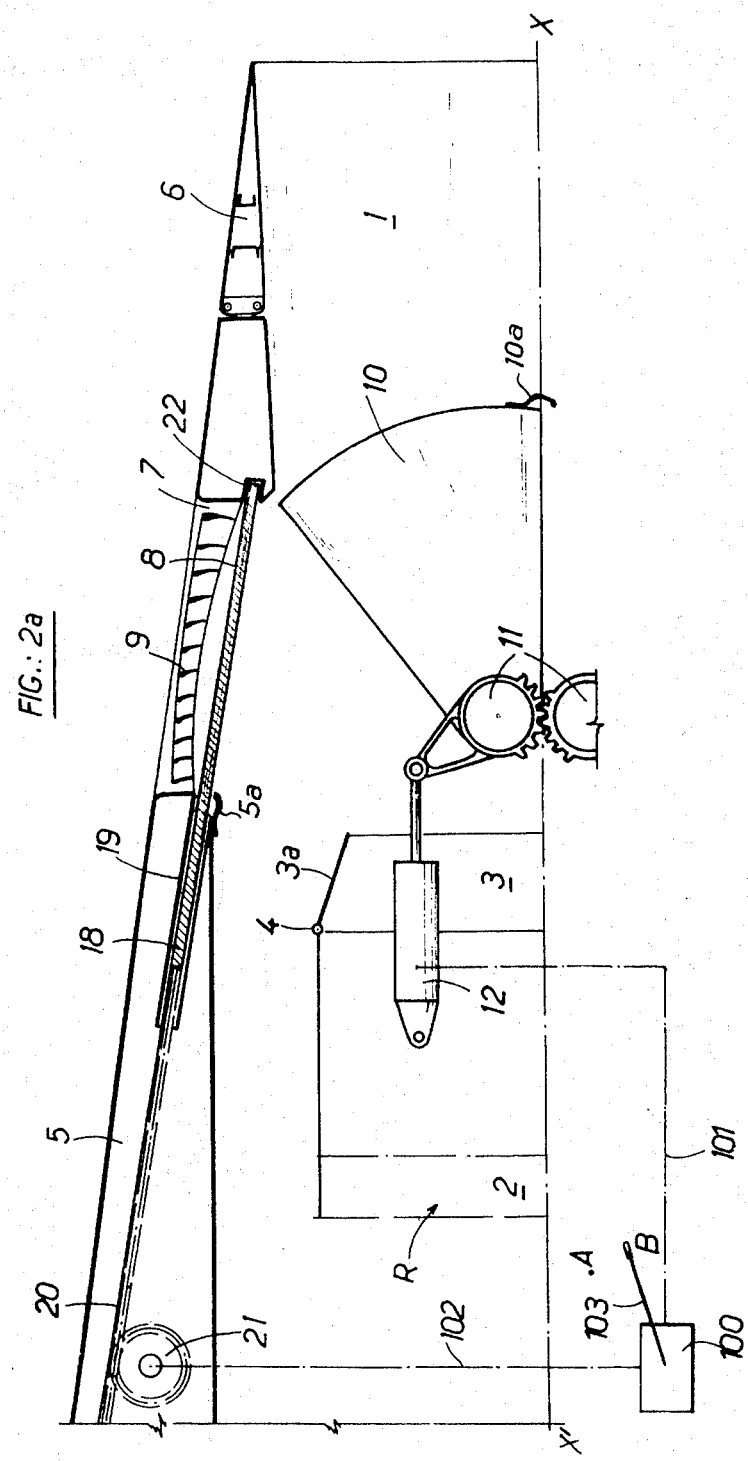
FIG.: 2a

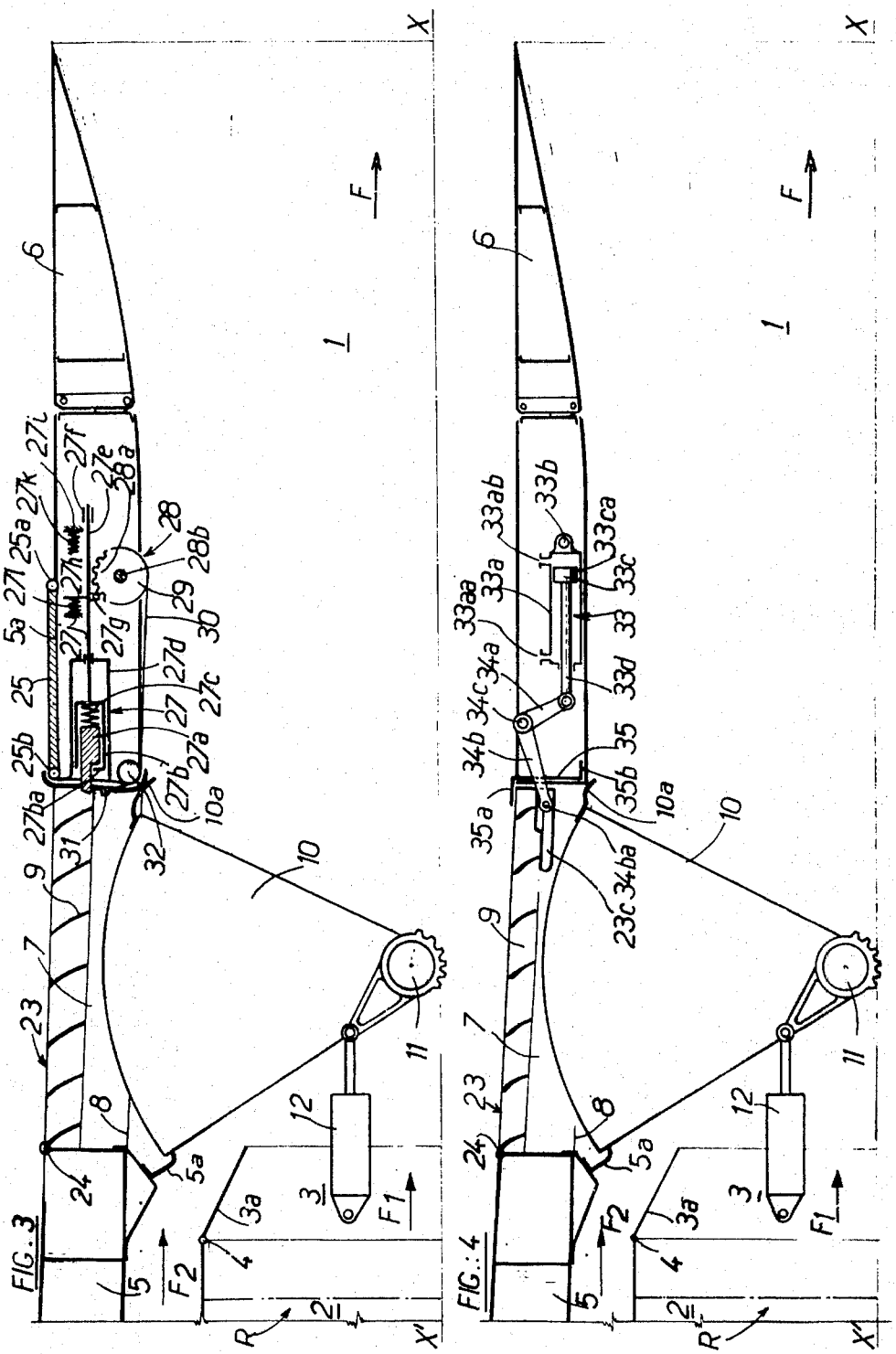

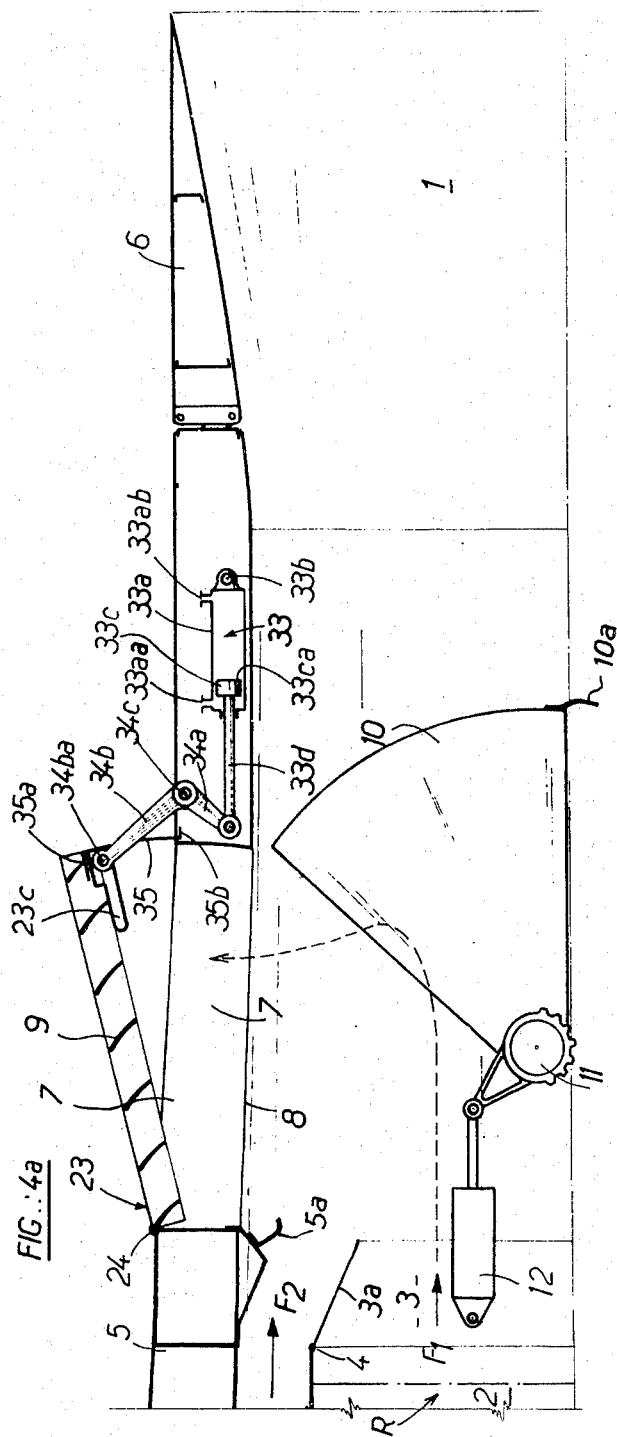

METHOD AND MEANS FOR OPPOSING THE ROTATION OF A WINDMILLING TURBOJET ROTOR DURING FLIGHT

The present invention refers to aircraft propelling turbojet engine and it has for its object a method and means for opposing the rotation of the rotor of such a turbojet engine when windmilling during flight.

It may in fact occur in the case of a multi-engine aircraft that at least one of the engines breaks down while the aircraft propelled by the remaining engines continues its flight for many reasons such for instance as the impossibility of landing when flying over an ocean, the urgency of a service, the maintenance of a rentable activity of a flying system. The disabled engine is subjected to the passage of a flow of air under the dynamic pressure produced by the flight of the aircraft and consequently its rotor rotates after the manner of an airturbine. This is what is generally termed a windmilling of the rotor.

Now, such a windmilling, continuing up to the end of the journey even at a reduced speed, of the rotor of a disabled engine is likely for certain types of failure, to damage the engine and to lead to lengthy and expensive repairs, which repairs might have been much less serious if dealt with at the start. Thus, for instance, if for any reason whatever such as the failure of a lubrication circuit, damaged shaft bearings or the like, an abnormal resistance opposes the rotation of the rotor, the forced windmilling of the latter sometimes during several hours may lead to serious havoc requiring important subsequent dismantling and replacement of expensive parts.

Furthermore, it should be remarked that the inertia of the rotors of large turbojet engines equipping in particular civil aircrafts is very high and consequently the energy thus appearing is considerable, taking into account the high value of the pressure of the flow of air passing through the failing engine, chiefly if the aircraft is flying at supersonic speeds.

It is therefore advisable in all cases to stop during flight and rotor of the broken down turbojet engine and it is possible to this end to operate in various manners. It is possible for instance to associate a brake with the rotor shaft. However, by reason of the high kinetic energy of the rotating rotor, the brake should be powerful and act gradually so that it must be bulky. It is also possible to close at least partly the passage afforded for the flow of air passing through the disabled turbojet engine at its inlet or at its outlet (for instance, in the jet pipe) or else in an intermediate part of the engine, say in the turbine inlet distributor. But this solution of the problem also requires heavy, bulky and intricate contrivances, chiefly in the case of large thrust engines.

A type of turbojet engine very frequently resorted to in practice is provided with an exhaust assembly adapted to discharge a gas flow in a rearward direction, a thrust reverser device, and means for moving said thrust reverser device between an operative position, in which said thrust reverser device projects into said gas flow and diverts said flow in a direction at an angle to said rearward direction, and an inoperative position, in which said thrust reverser is withdrawn from said gas flow.

The present invention has for its object a method and means opposing the rotation of a windmilling rotor of such a turbojet engine, said method and means showing over prior art the advantages of simplicity, light weight and low cost price.

In its general principle, the method according to the invention comprises the two steps, when arresting the rotation of the windmilling rotor is desired, of moving said thrust reverser device into its operative position, whereby the flow of air which passes through said exhaust assembly is diverted by said thrust reverser device, and of throttling said diverted flow. The flow of air under flight pressure which is at least partly prevented from flowing rearwardly out of the engine is also prevented from flowing freely in its diverted direction and consequently the drop in pressure of the stream of air between the upstream and the downstream ends of the rotor is no longer sufficient for the upkeep of a windmilling rotation. The windmilling is thus stopped.

The means resorted to for this purpose include partly means already incorporated with the engine which leads to a simplification of the design of the windmilling opposing means since in particular it is no longer necessary to resort, for stopping the flow of air through the engine, to independent, heavy and bulky closing means. The unexpected result of this is that the thrust reverser device cooperates in solving the problem of opposing the windmilling of the turbojet rotor for which purpose said thrust reverser device was not designed hitherto and which purpose it does not fulfil in prior art.

In order to throttle the diverted flow of air, the invention provides various embodiments; according to a first embodiment, there is inserted across the path of the diverted flow of air a mechanical auxiliary shutter or closure device such as a flap or an inflatable body. According to another embodiment, there is generated across the path of the diverted flow of air a curtain of pressurized fluid such as compressed air supplied for instance by a compressor forming part of one of the other engines. According to another embodiment, applicable to the case where the diverted flow of air flows through a diverting passageway equipped with a grid of jet-deflecting vanes, the angular setting of said jet-deflecting vanes with reference to the general direction of flow of the diverted flow of air is modified so as to throttle the flow of air passing through said diverting passageway. To this end, the system of grid vanes may be carried by a structure adapted to pivot round an axis between a retracted position for which said diverted flow is not throttled and an extended position for which said diverted flow is throttled.

During normal flight that is when there is no engine failure, such an adjustable grid structure can play two parts: in its retracted position it gives the speed of the diverted jet a component directed forwardly, whereby a braking thrust is generated; in its extended position it acts as an aerodynamic brake adapted for instance, to further the return of an aircraft flying at supersonic speed to subsonic conditions of flight. It forms thus a part which is already exsistent on an aircraft so that its use for the purposes and for the specific requirements of the invention cuts out the necessity of resorting to further parts for throttling the diverted flow of air.

According to a feature of the invention, the grid carrying structure is adapted to pivot freely round its axis so as to be urged into extend position by the pressure of the diverted flow of air. The grid structure has then a tendency to assume a position of equilibrium corresponding to a predetermined angular setting for which the antagonistic total pressures to either side of the grid structure, to wit that of the diverted flow of air and that of the external flow of air are equal. Adjustable means such as a cable are then actuated so as to return the grid-carrying structure into its retracted position while means for damping the pivotal movement of said structure may furthermore be provided so as to prevent undesired vibrations.

According to a modification the angular setting of the grid-carrying structure is controlled by a linkwork actuated in the desired direction by a suitable power unit such as a jack.

In all cases means may be provided for locking the grid-carrying structure in its retracted position, said means operating sequentially with the means controlling the angular setting of said structure.

According to a further arrangement which is applicable to those cases where the diverted flow of air is throttled by the insertion of an angularly adjustable grid-carrying structure, means may be provided for closing when said structure is in its extended position the space extending between one edge of the diverting passageway and the cooperating edge of the angularly adjustable structure in a manner such as to constrain the diverted flow of air to flow towards said structure in its extended position. Said means may include for instance a mechanical obstacle or resistance such as a panel connected mechanically with said structure, or again a fluid obstacle or resistance such as a curtain constituted by a sheet of compressed air.

A further embodiment of the invention is applicable to the case where the turbojet engine includes a jet pipe bifurcated to form two branches, viz. a first branch terminating in a propulsion nozzle and a second branch which forms a jet-diverting passageway extending at an angle to said propulsion nozzle, a thrust reverser device including two shutter or closure devices associated respectively with said first and with said second branch, means for moving said two shutter devices, and a device coupling together said two shutter devices so that one of said branches is open when the other is closed. In such a case, said coupling device may, according to the invention, be disconnected so that the two shutter devices may be moved to a position in which each of said branches is closed.

The following description given by way of example in a non-limiting sense provides a proper understanding as to the execution of the invention, reference being made to the accompanying drawings wherein:

FIGS. 1 to 4 are half axial cross-sections of the rear part, including the exhaust assembly, of a turbojet engine provided with means opposing the windmilling of the rotor of said turbojet, said figures illustrating four different embodiments of the invention in their inoperative condition.

FIGS. 1a to 4a illustrate similarly the same embodiments in their operative condition.

Figure 3A:
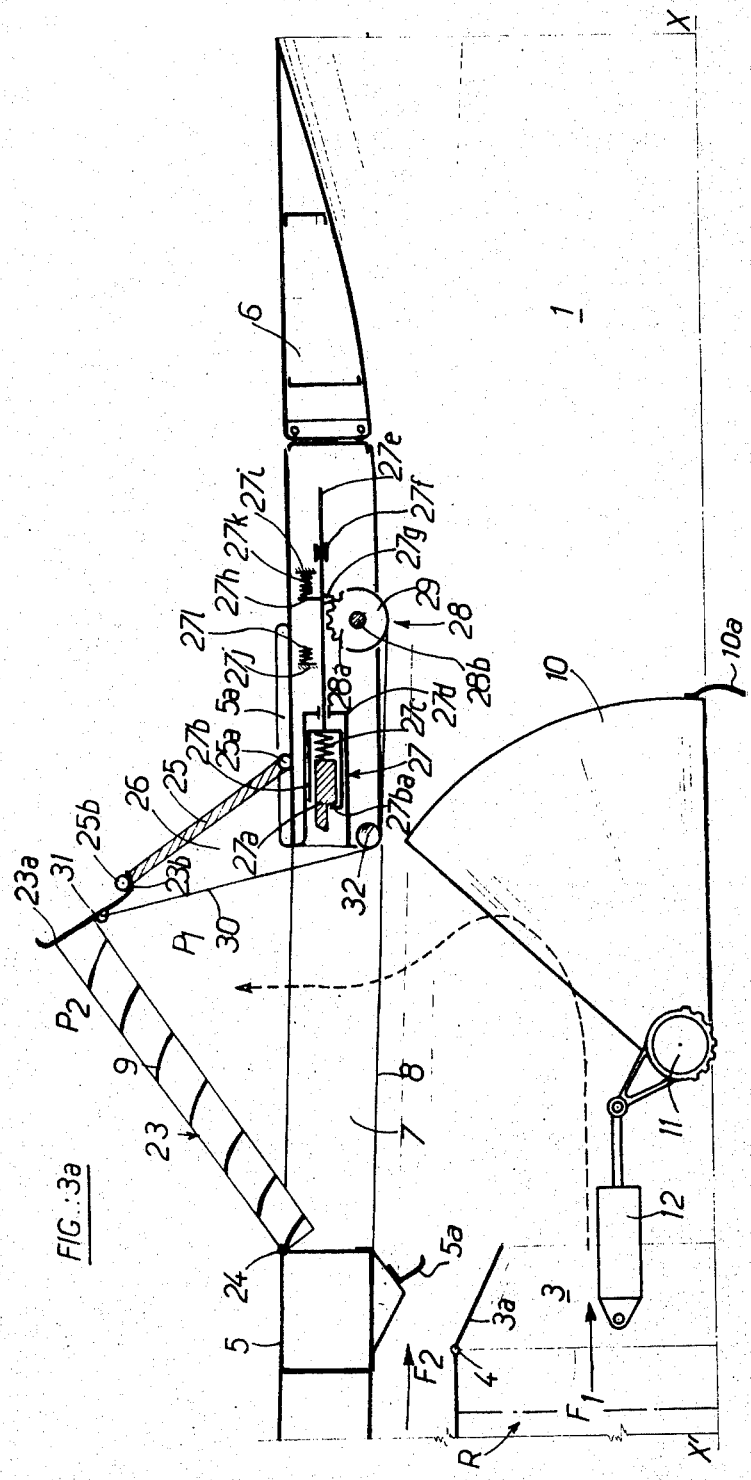

In the drawings, there is shown the exhaust assembly having as an axis X'—X, of a turbojet engine serving for the propulsion of a multi-engined aircraft which is not illustrated. The examples illustrated show an exhaust assembly including a jet-pipe of the ejector type through which a mixture of two gas flows passes, to wit a primary flow $F_1$ and a secondary flow $F_2$ forming together a propulsive gas flow F which exhausts rearwardly through a propulsion nozzle 1. The primary flow $F_1$ is constituted for normal operative conditions in the turbojet by a flow of gas which is first compressed in a compressor (which is not illustrated) and then heated in a heating or combustion chamber (which is not illustrated), after which it expands in succession in a turbine 2 and in a primary nozzle 3. Said primary nozzle is generally adjustable by means of flaps 3a adapted to rock round axes 4 under the action of jacks which are not illustrated. The turbine 2 drives the compressor 3 into rotation and the rotary unit constituted by the compressor and turbine will be termed hereinafter the rotor of the turbojet engine and will be designated generally by the reference letter R. The secondary flow $F_2$ is constituted by a peripheral flow of air enclosing the primary flow and it is confined outwardly by a secondary fairing 5 to the terminal edge of which secondary flaps 6 are secured. The jet-pipe is bifurcated to form two branches, viz. a first branch terminating in the propulsion nozzle 1, and a second branch which forms at least one jet-diverting passageway 7 extending at an angle to said propulsion nozzle. These jet-diverting passageways, the number of which may be equal to two, and each opens into the atmosphere through a grid 9 of jet-deflecting vanes.

A thrust-reverser device which may be adjusted within a range extending between an operative and an inoperative position provides for an at least partial closing of the jet pipe at a point to the rear of the bifurcation. This thrust reverser device includes in the case illustrated two so-called clam shells 10 controlled synchroneously by a conventional system of inter engaging gears 11 rigid with links controlled by jacks 12. The references 5a and 10a designate packings carried respectively by the fairing 5 and clam shells 10.

In the position illustrated in FIGS. 1 to 4, the clam shells or 10 are shown in their inoperative condition for which the propulsion nozzle is open, whereas the jet-diverting passageways 7 are closed. The gas flow F is thus discharged rearwardly of the turbojet engine so as to supply a forwardly directed propulsive thrust.

In the position illustrated in FIGS. 1a to 4a, in contradistinction, the clam shell 10 are shown in their operative condition for which the jet-diverting passageways are open, while the propulsion nozzle 1 is at least partly closed. The gas flow F is then diverted as shown by the arrow drawn in dashes towards the passageways 7. The diverted gas flow is guided by the grids of vanes 9 which deflect it forwardly, whereby a braking thrust is generated. The fact should be stressed that in no prior arrangement the jet-diverting passageways 7 and propulsion nozzle 1 are ever simultaneously in a closed or open condition.

As disclosed hereinabove it may occur that at least one of the turbojet engines breaks down and that the aircraft however flying with the remaining engines. There flows then through the disabled turbojet engine a flow of air subjected to the aerodynamic flight pressure so that its rotor starts windmilling. The primary flow $F_1$ passing out of the turbine 2 forms then the flow of air which it is desired, according to the invention, to cut out or at least to impede to a sufficient extent for the windmilling to stop automatically.

FIGS. 1 and 1a show a first embodiment wherein the flow of the diverted flow at air is throttled, as illustrated in FIG. 1 a, by means of at least one curtain of pressurized fluid.

To this end, the fairing 5 carries on the downstream side of the jet-diverting passageway 7 a manifold 13 fed with a pressurized fluid, preferably air tapped off the compressor of another engine which is working normally. The reference number 14 designates a pipe for feeding the manifold 13 with pressurized fluid, while 15 designates a control valve controlling the feed pipe 14. A slot or a plurality of ports 16 is formed in the wall of said manifold in registry with the jet-diverting passageways 7 over a peripheral extent equal to at least their breadth.

When the engine considered breaks down, the pilot sets first the clam shells 10 in their operative position (FIG. 1a) after which he opens the valve 15. A curtain or sheet 17 of compressed air is then formed which throttles and practically closes the jet-diverting passageway 7. The diverted flow of air can therefore no longer pass out of the engine and consequently the total pressure at the outlet of the rotor R increases speedily until it becomes substantially equal to the total inlet pressure which leads to the desired stopping of the windmilling of the rotor.

FIGS. 2 and 2a illustrate a second embodiment which differs from that illustrated in FIGS. 1 and 1a through the fact that the fluid resistance created by curtain 17 associated with a jet-diverting passageway 7 has been replaced by a mechanical resistance such as a flap 18 slidingly fitted in the slideways 19 housed within the secondary fairing 5. At its front end, the flap 18 carries a rack 20 meshing with a pinion 21 driven by a motor which is not illustrated. In its inoperative position (FIG. 2), the flap 18 uncovers completely the jet-diverting passageway 7 so as to allow the braking of the aircraft, when required, by reversing the propulsive jet. In its operative position (FIG. 2a), in contradistinction, the flap closes completely said passageway, its rear end abutting then inside a groove 22 formed in the secondary fairing 5.

FIGS. 3 and 3a relate to a third embodiment wherein the diverted flow of air flowing through the jet-diverting passageway is throttled as a consequence of a modification in the angular setting of the jet-deflecting vanes forming the grid 9 with reference to the general direction of said diverted flow of air.

To this end, the grid of vanes 9 is rigid with a grid-carrying structure 13 which is mounted for pivotal movement about a shaft 24 carried by the secondary fairing 5, said shaft 24 lying advantageously, but not necessarily along the front edge of said grid-carrying structure. Consequently, the grid may occupy retracted position (FIG. 3) or an extended position (FIG. 3a). During normal operation of the turbojet engine, that is when the latter is not failing, the grid 9 cooperates in its retracted position with the clam shells 10, so as to provide conventionally for a reversal of the propulsive jet. In its extended position, it serves also in a conventional manner as an aerodynamic brake for the aircraft, the propulsion nozzle 1 being of course open in such a case. In the case of a breakdown of the turbojet engine, the pilot closes the propulsion nozzle 1 by resorting to the clam shells 10 and he sets then the grid 9 in its operative displayed condition. The diverted flow of of air is then throttled as a consequence of the angular setting of the vanes in the extended grid and of the pressure exerted by the external air flowing into the grid through its outer surface.

In the example illustrated, the grid-carrying structure is adapted to pivot freely round its axis 24 so as to be urged into its extended position by the pressure of the diverted flow of air. Said extended position may in fact correspond to a position of equilibrium for which the total pressures $p_1$ and $p_2$ acting on either side of the grid 9 and produced respectively by the diverted flow of air and by the external air flow are equal, the grid 9 being then a practically impervious obstacle for the diverted flow of air. When this position of equilibrium is reached, the windmilling of the engine rotor is stopped.

A panel 25 or the like means is provided for closing, when the grid 9 is in its extended position, the gap 26 extending between the rear edge of the jet-diverting passageway 7 and that of the grid 9, through which gap a portion of the diverted flow of air might escape.

There is also provided a locking system 27 and also a control system 28 for the angularly adjustable grid-carrying structure 23. The locking system 27 is adapted to hold the grid fast in its retracted position illustrated in FIG. 3. It includes a locking bolt 27a slidingly carried in a cylinder 27b in which it is held by a spring 27c. The cylinder 27b is in its turn slidingly carried inside another cylinder 27d rigid with the fairing 5. The bottom of the cylinder 27d is bored so as to afford a passage for a rod 27e rigid with the bottom of the first cylinder 27b and slidingly fitted in the slideway 27f rigid with the fairing 5.

The control system 28 includes a toothed wheel 28a keyed to a shaft 28b driving also a winding drum 29 described hereinafter. The shaft 28b is driven by a motor which is not illustrated, as required by the pilot.

The rod 27e carries a tooth 27g adapted to mesh with the teeth of the wheel 28a; it also carries a stop 27h adapted to occupy either of two extreme positions the stop being located in registry with said tooth 27g. For one of its extreme positions, the stop 27h engages through the agency of the spring 27k a further stop 27i rigid with the fairing 5 (FIG. 3a). For its other extreme position, the stop 27h engages with the interposition of a spring 27l a similar stop 27j (FIG. 3)

Starting from the position illustrated in FIG. 3a, and assuming the toothed wheel 28a begins revolving anti-clockwise, it meshes with the tooth 27g. The rod 27e is driven consequently towards the left hand side of the drawing and the locking bolt 27a is urged in its turn towards its locking position illustrated in FIG. 3. The spring 27l which is slightly compressed each time a tooth of the wheel 28a engages the tooth 27g allows said wheel to continue revolving in the same direction. When the direction of rotation of the toothed wheel 28a changes, the spring 27l expands and furthers the meshing of the tooth 27g in the opposite direction. The rod 27e and consequently the cylinder 27b return then towards the right hand side together with the locking bolt 27a cooperating with this purpose with a projection 27ba rigid with the cylinder 27b. The outlines of the teeth on the wheel 28a and of the tooth 27g should obviously be such that any locking of the wheel 28a is impossible.

A winch is adapted to return the grid 9 into its retracted position by means of at least one cable 30 one end of which is secured to a hook 31 rigid with the grid-carrying structure 23. Said cable extends over transmission pulleys such as 32 and is wound round a winch drum 29.

The closing panel 25 referred to hereinabove carries at each end of its rear edge a stud 25a adapted to slide inside a longitudinal slideway 5a provided on the fairing 5. The upstream edge of said panel carries a spindle 25b adapted to be held in position by external rounded projections 23a on the grid-carrying structure 23 when the grid 9 is in its retracted condition, the panel 25 being then in its retracted position illustrated in FIG. 3. The spindle 25b may furthermore be carried along by inner rounded projections 23b on the grid-carrying structure, thanks to ports formed in the panel in registry with the last-mentioned rounded projections when the grid is released and is shifted towards its extended position. The studs 25a slide then along the slideway 5a.

The operation of the said systems is as follows.

Under normal conditions and as illustrated in FIG. 3, the grid 9 is in its retracted position in which it is locked by the nose on the locking bolt 27a. In the case of a failure of the turbojet engine, the pilot first sets the clam shells 10 in their operative position for which they close the propulsion nozzle 1, after which he starts the motor driving the shaft 28b in a clockwise direction. The rod 27e moves then towards the right-hand side, so that the bolt 27a releases the grid 9. At the same time, the cable 30 becomes loose. The grid 9 begins then pivoting under the pressure of the diverted flow of air. The motor driving the shaft 28b is then deenergized so that the grid 9 continues its movement until the pressures $p_1$ and $p_2$ to either side of the grid 9 compensate each other (FIG. 3a) or else, if such a position cannot be reached, until the studs 25a have reached the end of their stroke inside the slideway 5a. The panel 25 assumes then an oblique position and closes constantly the gap 26. When the pilot wishes to retract the grid 9, he causes the motor driving the shaft 28b to rotate anticlockwise. The rod 27e is then urged towards the left-hand side and the locking bolt 27a returns into its locking position. The shaft 27b continues revolving so that the cable 30 is wound round the drum 29 and returns the grid 9 and panel 25 into their retracted positions illustrated in FIG. 3. The motor driving the shaft 28b is then stopped.

FIGS. 4 and 4a relate to a fourth embodiment of the invention, which differs from the preceding one by the system controlling the angular setting of the grid 9.

Instead of pivoting freely as in the preceding case, the angularly adjustable grid-carrying structure 23 is actuated in either direction by a link work controlled by at least one power unit such as a double acting jack 33. The latter includes a cylinder 33a pivotally secured to the fairing 5 through a pivot 33b, while a piston 33c cooperating with the cylinder is rigid with a rod 33d pivotally secured to the smaller arm 34a of a bellcrank 34a,34b. Said bell crank is pivotally secured round an axis 34c to the fairing 5, while its longer arm 34b slides through its end 34ba in a slideway 23c rigid with the angularly adjustable structure 23. A pilot-valve, which is not illustrated, provides for the feeding and emptying of the jack through the channels 33aa and 33ab.

A closing panel 35 the operation of which is similar to that of the panel 25 described with reference to FIGS. 3 and 3a is provided with flanges 35a and 35b folded respectively towards the front and towards the rear of the turbojet engine. When the grid 9 is extended, its rear inner edge carries along the panel 35 through its flange 35a. The grid 9 reaches the end of its stroke when the flange 35b of the panel abuts against the outer wall of the fairing 5 as illustrated in FIG. 4a. During the retracting of the grid 9, the panel 35 returns into its starting position for which its flange 35b returns into contact with the inner surface of the fairing 5 as illustrated in FIG. 4.

According to a modification of the preceding embodiment the channels 33aa and 33ab provided for feeding and emptying the jack 33 may be closed by means of valves which are not illustrated, while the piston 33c may be provided with one or more ports 33ca through which oil may pass. The jack 33 would then play merely the part of a damper for the pivotal movement of the angularly adjustable grid-carrying structure 23 whereby undesired vibrations of the latter when reaching its position of equilibrium are avoided.

In certain turbojet engines, the thrust reverser may include first means (such as the clam shells 10) for closing the propulsion nozzle 1, and second means for closing the jet-diverting passageway 7 which second means are separate from the first-mentioned means and may be similar for instance to the flaps 18 illustrated in FIGS. 2 and 2a.

Said first and second closing means are often controlled by parts 12 and 21 which are interconnected by a coupling device such as 100 operating in a manner such that, when the propulsion nozzle is open, the jet-diverting passageway 7 is closed and conversely. The reference numbers 101 and 102 designate functional connections between the coupling means 100 and said parts 12 and 21. In order to obtain in such a case the simultaneous closing of the propulsion nozzle 1 and of the jet-diverting passageway it is advantageous to proceed in accordance with the invention by disconnecting (FIG. 2) for instance by means of a control handle 103, such coupling device 100. It is thus possible to resort to already extent closing means 19 provided for the jet-diverting passageway 7, in order to throttle the diverted flow of air.

Such a disconnection of the coupling device 100 may be obtained for instance by closing a valve in the normal feeding channel leading to the jacks 12 controlling the closing means 10 for the propulsion nozzle 1. Such a valve may, in fact, always be provided, however complex the circuits may be. It is sufficient in such a case to feed directly through another channel the jacks 12 so as to ensure the desired associated closing of the jet-diverting passageway 7 and of the ejecting channel. Of course, other means for disconnecting the coupling device 100 may be used such as a declutching, the control of a switch or of a leak, the connection with a return low-pressure space of a chamber subjected to high pressure and controlling for instance a locking jack and the like.

There are illustrated diagrammatically at A and B in FIGS. 2a and 2b the two possible positions of the control handle 103. In FIG. 2, said control handle is in the position A for which the coupling means 100 are operative, so that at any moment either the propulsion nozzle 1 or the jet-diverting passageway 7 is open. In FIG. 2a, the handle 103 is in its position B for which the coupling device 100 is inoperative. The clam shell 10 and the flaps 18 may then be controlled in a manner such as to close both the propulsion nozzle 1 and the jet-diverting passageway 7.

Obviously, the embodiments described hereinabove are given soley by way of exemplification and it is possible to modify them for instance by substituting technically equivalent means for those described without exceeding thereby the scope of the invention as defined by the accompanying claims.

Thus, it would be possible to replace the panel 25 illustrated in FIGS. 3 and 4 by an inflatable body or by a curtain of compressed air blown out of a manifold similar to the manifold 13 illustrated in FIG. 1 and the injection slot of which would be located on the outer surface of the fairing 5. The manifold 13 might in fact be located otherwise than in the manner illustrated and it might for instance extend round the grid 9. Instead of a single manifold 13, several containers may be used which manifolds might be annular or occupy elementary sectors in registry with the grids. On the other hand, the injecting slots might be replaced by sufficiently dense local jets. Aerodynamic and mechanical means might also be associated in order to improve the fluid-tightness of the grid and resistances.

As to the grid-carrying angularly adjustable structure 23, its pivotal axis 24 might lie otherwise than along the front edge of the grid and the means releasing or re-engaging said structure might be different from those disclosed with particular detail.

It should be observed lastly that the stopping of the rotor of a broken down turbojet engine leads to a certain increase in the drag which may be of interest with a view to obtaining a speedy slowing down of the aircraft without detrimentally affecting however the comfort of the passengers and without leading to any nose lift. This forms thus a further advantage of the invention which includes means acting furthermore as high speed brakes, chiefly in the case where such means include an angularly adjustable grid such as that described with reference to FIGS. 3 and 4.

What I claim is:

1. A method for opposing during flight the windmilling of the rotor of a disabled turbojet engine of an aircraft caused by a flow of air under dynamic pressure through said disabled turbojet engine, wherein said turbojet engine includes an exhaust assembly adapted to discharge a gas flow in the rearward direction, and a thrust reversal device movable between an operative position projecting into said gas flow to divert said flow in a direction at an angle to said rearward direction, and an inoperative retracted position, said method comprising the steps of (1) moving said thrust reversal device into its operative position, whereby the flow of air which passes through said disabled turbojet engine is diverted by said thrust reversal device, and (2) throttling said diverted flow to increase the discharge pressure of said gas flow and thus increase the resistance in said engine downstream of said rotor sufficient to substantially prevent further gas flow through said disabled engine.

2. A method for opposing during flight the windmilling of the rotor of a disabled turbojet engine of an aircraft caused by a flow of air under dynamic pressure through said disabled turbojet engine, wherein said turbojet engine includes a jet pipe bifurcated to form two branches, one of said branches terminating in a propulsion nozzle and the other forming a jet-diverting passageway extending at an angle to said propulsion nozzle, said method comprising the steps of (1) closing said first branch at a point downstream of the bifurcation to direct the air flow to said second branch, and (2) throttling said second branch to increase the air pressure in said two branches and thus increase the resistance in said engine downstream of said rotor sufficient to substantially prevent further air flow through said disabled engine.

3. A method for opposing during flight the windmilling of the rotor of a disabled turbojet engine of an aircraft caused by a flow of air under dynamic pressure through said disabled turbojet engine, wherein said turbojet engine includes a jet pipe bifurcated to form two branches, one of said branches terminating in a propulsion nozzle and the other forming a jet-diverting passageway extending at an angle to said propulsion nozzle, and a thrust reversal device movable between an inoperative position in which said first branch is open and said second branch is closed and an operative position in which said second branch is open and said first branch is closed at a point downstream of the bifurcation, said method comprising the steps of (1) moving said thrust reversal device to its operative position and (2) throttling said second branch to increase the air pressure in said two branches and thus increase the resistance in said engine downstream of said rotor sufficient to substantially prevent further air flow through said disabled engine.

4. A method according to claim 3 wherein said throttle step comprises the step of generating a curtain of pressurized fluid across said second branch.

5. A method according to claim 3 wherein said turbojet engine includes a grid of jet-deflecting vanes extending across said second branch and said throttling step comprises the step of adjusting the angular setting of said jet-deflecting vanes relative to the general direction of flow of the diverted flow of air flowing in said second branch.

6. A method for opposing during flight the windmilling of the rotor of a disabled turbojet engine of an aircraft caused by a flow of air under dynamic pressure through said disabled turbojet engine, wherein the turbojet engine includes a jet pipe bifurcated to form two branches, one of said branches terminating in a propulsion nozzle and the other branch forming a jet-diverting passageway extending at an angle to said propulsion nozzle, a thrust reversal device including a closure device for each of said branches, means for moving said closure devices and a device coupling together said closure devices so that one of said branches is normally open when the other is closed, said method comprising the steps of (1) rendering said coupling device inoperative and (2) moving said two closure devices to close both of said branches to increase the air pressure in said two branches and thus increase the resistance to further air flow through said disabled engine.

7. A method for opposing during flight the windmilling of the rotor of a disabled turbojet engine of an aircraft caused by a flow of air under dynamic pressure through said disabled turbojet engine, wherein said turbojet engine includes a jet pipe bifurcated to form two branches, one of said branches terminating in a propulsion nozzle and the other forming a jet-diverting passageway extending at an angle to said propulsion nozzle, said method comprising the steps of (1) closing said first branch at a point downstream of the bifurcation to direct the air flow to said second branch and (2) introducing a mechanical auxiliary closure device into said second branch to increase the air pressure in said two branches and thus increase the resistance to further air flow through said disabled engine.

8. A method according to claim 7 wherein said turbojet engine includes a thrust reversal device movable between an inoperative position in which said first branch is open and said second branch is closed and an operative position in which said second branch is open and said first branch is closed at a point downstream of the bifurcation, and said first branch is closed by moving said thrust reversal device to its operative position.

9. A method for opposing during flight the windmilling of the rotor of a disabled turbojet engine of an aircraft caused by a flow of air under dynamic pressure through said disabled turbojet engine, wherein said turbojet engine includes an exhaust assembly adapted to discharge a gas flow in the rearward direction, and a thrust reversal device movable between an operative position projecting into said gas flow to divert said flow in a direction at an angle to said rearward direction, and an inoperative retracted position, said method comprising the steps of (1) moving said thrust reversal device into its operative position, whereby the flow of air which passes through said disabled turbojet engine is diverted by said thrust reversal device, and (2) introducing a mechanical auxiliary closure device across said diverted flow to increase the discharge pressure of the gas flow and thus increase the resistance to further gas flow through said disabled engine.

10. An arrangement for opposing during flight the windmilling of the rotor of a disabled turbojet engine of an aircraft caused by a flow of air under dynamic pressure through said disabled turbojet engine, wherein said turbojet engine includes an exhaust assembly adapted to discharge a gas flow in a rearward direction, and a thrust reversal device movable between an operative position projecting into said gas flow to divert said flow in a direction at an angle to said rearward direction, and an inoperative retracted position, said arrangement comprising means adapted to throttle the gas flow diverted by the thrust reversal device when in its operative position to increase the discharge pressure of said gas flow and thus increase the resistance in said engine downstream of said rotor sufficient to substantially prevent further gas flow through said disabled engine.

11. An arrangement for opposing during flight the windmilling of the rotor of a disabled turbojet engine of an aircraft caused by a flow of air under dynamic pressure through said disabled turbojet engine, wherein said turbojet engine includes a jet pipe bifurcated to form two branches, one of said branches terminating in a propulsion nozzle and the other branch forming a jet-diverting passageway extending at an angle to said propulsion nozzle, said arrangement comprising means for closing said first branch a point downstream of the bifurcation, and means adapted to throttle said second branch, when said first branch is closed, to increase the air pressure in said two branches and thus increase the resistance in said engine downstream of said rotor sufficient to substantially prevent further air flow through said disabled engine.

12. An arrangement for opposing during flight the windmilling of the rotor of a disabled turbojet engine of an aircraft caused by a flow of air under dynamic pressure through said disabled turbojet engine, wherein said turbojet engine includes a jet pipe bifurcated to form two branches, one of said branches terminating in a propulsion nozzle and the other branch forming a jet-diverting passageway extending at an angle to said propulsion nozzle, and a thrust reversal device, movable between an inoperative position in which said first branch is open and said second branch is closed, and an operative position in which said second branch is open and said first branch is closed at a point downstream of the bifurcation, said arrangement comprising means adapted to throttle said second branch when said thrust reversal device is in its operative position to increase the air pressure in said two branches and thus increase the resistance in said engine downstream of said rotor sufficient to substantially prevent further air flow through said disabled engine.

13. An arrangement according to claim 12 wherein said throttling means includes a mechanical auxiliary closure device.

14. An arrangement according to claim 13 wherein said mechanical auxiliary closure device includes a flap adapted to extend across the said second branch.

15. An arrangement according to claim 12 wherein said throttling means include means to generate a curtain of pressurized fluid across said second branch.

16. An arrangement according to claim 12 wherein the turbojet engine includes a grid of jet-deflecting vanes extending across said second branch, and said throttling means include means for adjusting the angular setting of said jet-deflecting vanes relative to the general direction of flow of the diverted flow of air flowing in said second branch towards said grid of vanes between an inoperative position at which said second branch is not throttled and an operative position at which said second branch is throttled.

17. An arrangement according to claim 16 wherein said grid of vanes is mounted for pivotal movement about an axis, and means for adjusting the angular setting of the vanes comprise means for pivoting said grid about said axis between a retracted position at which said second branch is not throttled and an extended position at which said second branch is throttled.

18. An arrangement according to claim 17 wherein said grid is adapted to pivot freely about its axis so as to be urged into its extended position under the action of the pressure of the flow of air flowing in said second branch, said arrangement further comprising means for returning said grid to its retracted position.

19. An arrangement according to claim 18 wherein the means returning the said grid to its retracted position includes cable means and means for winding and unwinding the latter.

20. An arrangement according to claim 17 wherein the means for pivoting the said grid includes a linkage together with jack means for actuating said linkage in two directions.

21. An arrangement according to claim 17 further comprising means for locking said grid in its inoperative position and means for controlling said locking means.

22. An arrangement according to claim 21 wherein said control means are adapted to cooperate sequentially with the means for pivoting the grid.

23. An arrangement according to claim 17 further comprising means for damping the pivotal movement of said grid.

24. An arrangement according to claim 17 further comprising means for closing, when the grid is in its extended position, the gap extending between the adjacent edges of said second branch and said grid so as to constrain the diverted flow of air flowing in said second branch to be directed towards said grid in its extended position.

25. An arrangement according to claim 24 wherein said gap-closing means include a mechanical barrier.

26. An arrangement according to claim 24 wherein said gap-closing means include means for generating a curtain of pressurized fluid across said gap.

27. An arrangement for opposing during flight the windmilling of the rotor of a disabled turbojet engine of an aircraft caused by a flow of air under dynamic pressure through said disabled turbojet engine, wherein the turbojet engine includes a jet pipe bifurcated to form two branches, one of said branches terminating in a propulsion nozzle and the other branch forming a jet-diverting passageway extending at an angle to said propulsion nozzle, a thrust reversal device including a closure device associated with each of said two branches, means for moving said closure devices, and a device coupling together said closure devices so that one of said branches is open when the other is closed, said arrangement comprising means for rendering said coupling means inoperative to allow said closure devices to be moved to close both of said branches to increase the air pressure in said two branches and thus increase the resistance to further air flow through said disabled engine.

* * * * *